(12) United States Patent
Carapelli

(10) Patent No.: US 8,524,305 B2
(45) Date of Patent: Sep. 3, 2013

(54) INSTANT SAUCES FOR FOOD USE

(75) Inventor: Elena Carapelli, Florence (IT)

(73) Assignee: Drogheria E Alimentari S.r.l., San Piero a Sieve (IT)

( * ) Notice: Subject to any disclaimer, the term of this patent is extended or adjusted under 35 U.S.C. 154(b) by 1515 days.

(21) Appl. No.: 11/534,085

(22) Filed: Sep. 21, 2006

(65) Prior Publication Data

US 2007/0281063 A1 Dec. 6, 2007

(51) Int. Cl.
*A21D 10/00* (2006.01)

(52) U.S. Cl.
USPC .......................................... 426/549; 426/531

(58) Field of Classification Search
None
See application file for complete search history.

(56) References Cited

U.S. PATENT DOCUMENTS

| | | | |
|---|---|---|---|
| 2,983,619 A * | 5/1961 | Shaw, Jr. et al. | 426/324 |
| 4,348,417 A * | 9/1982 | Greup et al. | 426/19 |
| 4,861,632 A * | 8/1989 | Caggiano | 428/35.2 |
| 5,945,149 A | 8/1999 | Andreae et al. | |
| 7,001,633 B2 * | 2/2006 | Pasch et al. | 426/326 |

FOREIGN PATENT DOCUMENTS

| WO | 95/05751 A1 | 3/1995 |
|---|---|---|
| WO | 97/42841 A1 | 11/1997 |

OTHER PUBLICATIONS

United States Potato Board, "Dehydrated Potatoes: Food Function Advances" in Asia Food Journal, Nov. 1, 2005.*

* cited by examiner

*Primary Examiner* — Elizabeth Gwartney
(74) *Attorney, Agent, or Firm* — Hogan Lovells US LLP

(57) ABSTRACT

The present invention relates to an instant sauce comprising 1 to 20% by weight of a basic mixture, 8 to 60% by weight of potato products and 20 to 91% by weight of a mixture of high granulometry ingredients, characterised in that said basic mixture comprises a mixture of at least one oily antioxidant compound in quantities ranging between 1 to 15% by weight, and salt in quantities ranging between 99 and 85% by weight.

37 Claims, No Drawings

INSTANT SAUCES FOR FOOD USE

FIELD OF THE INVENTION

The present invention relates to instant sauces for food use, and a process for the production thereof.

BACKGROUND ART

Drying is one of the oldest methods of preserving foodstuffs. The use of the sun and fire as drying agents is even mentioned in the bible; during the first and second world wars, many types of food were dried in an attempt to develop light, nutritious, stable and easily preparable foods for use by the military.

Later, people turned ever more to the production of dehydrated foods to feed groups and individuals facing long periods of isolation such as astronauts, explorers and mountaineers, or rather foods for preparation and consumption under extreme conditions.

The development of technologies and the patenting and manufacture of machinery adapted to providing perfectly dehydrated foodstuffs without any loss of aroma and flavour has lead to the ever increasing spread of dried foodstuffs, which are now finding daily use. Thus, besides the innumerable frozen, precooked and vacuum packed products, the evolution of dietary habits has also lead to the development of a wide range of dried and freeze-dried products.

Drying preserves foodstuffs by lowering the quantity of water or humidity in the foodstuff's matrix. This is essential for impeding microbial growth and the chemical degradation reactions which normally occur in fresh foodstuffs.

Maximising the reduction in water content delays or halts microbial development, since microorganisms cannot survive below a certain humidity threshold.

The drying conditions and the physico-chemical changes which occur during the process have an influence on product quality; more specifically, the drying method has a significant impact on colour, consistency, density, the porosity and absorption characteristics of the food material which will then be rehydrated. The same foodstuff can give rise to a completely different product depending on the type of dehydration it has undergone.

Subsequent rehydration depends on the level of cellular and structural destruction that has occurred during dehydration.

Foodstuffs may be dehydrated by exploiting a number of techniques.

Drying using the sun's rays is the oldest and most traditional method. Said technique requires constant exposure to direct sunlight during the day, in a situation with relative humidity of less than 20%. Foodstuffs dried this way may require 3-4 days to dry completely and are exposed to dirt, insects and rodents etc.

Conventionally, drying uses heat propagation. The most common examples include: The static heat propagation system wherein the foodstuffs are arranged in 2-3 cm layers over steel basins located in hot air circulating cabinets, at more or less 40-50° C.; the dynamic tunnel system where the trays containing the foodstuffs to be dried are placed on a conveyor belt which passes through a tunnel in the opposite direction to a current of temperature and humidity controlled air; the rotating cylinder dynamic system wherein the foodstuff materials are introduced into one end of a long cylinder in the opposite direction to a current of hot air, which results in the continuous remixing of the materials. Finally, there is fluid bed drying. Said method uses "fluidisation" technology wherein a layer of foodstuff material is positioned on a grid located at the base of a truncated conical container and a current of air is passed through from below at increasing speed.

In the conduction drying method, heat transfer occurs through a solid wall, without any movement of material.

Drying by irradiation, for example, is carried out by using infrared rays, by placing the material on conveyor belts which pass through tunnels in which suitable lamps are located.

These traditional methods, which can be applied to suitably cut or chopped raw or precooked foodstuffs have been more recently supplemented with more sophisticated methods.

This is the case for the drying of solutions or purees of foodstuffs. Indeed, prior to drying, foodstuffs frequently undergo specific processing transforming them into purees and solutions; this is the case for example with mashed potato or concentrated tomato juice. Such solutions are then transformed into powdered, flaked or granular products. This is realised thanks to drum or spray driers. In drum driers (drum drying) the wet food falls between one or two internally heated cylinders which dry the product. The latter is then "grated" by means of scouring blades which remove it from the surfaces of the drum. With spray dryers (spray drying), the liquid foodstuff is nebulised and the mist introduced from above into a hot air counter-current originating from below. The product dries and is separated from the air.

The powders thus produced may then be compacted and transformed into granules, using for example a roller compactor, a device fitted with rotating cylinders which produces granules.

Another drying process, even more widely used for producing dried foodstuffs is lyophilisation, which is achieved by means of rapid freezing followed by sublimation, and subsequent drying of the remaining food-bound water (freeze-drying). The low temperatures used in lyophilisation impede any chemical changes which might occur due to the numerous thermolabile components present in the food. Furthermore, lyophilisation guarantees the permanent dispersion of the food material, which dries without undergoing concentration, and forms a porous solid which dissolves rapidly and effectively when necessary.

Thus a solid, porous, friable, hygroscopic, very soluble mass is obtained, which occupies the same volume as the original frozen mass.

Somogyi and Luh, Vegetable dehydration. Commercial fruit processing; Woodruff, J. G., Luh, B. S., Eds.; Avi Publishing Co.: Westport, Conn., 1986, 435, report a study of the effects of the drying method on the quality of green asparagus where they refer that the lyophilised asparagus reconstituted in hot water shows much greater tenderness and solubility than the hot air dried product. Numerous other studies on the topic report similar findings. Other studies show that the low temperatures used in lyophilisation allow greater retention of flavours and volatile components with respect to other drying methods.

Traditional drying techniques are largely used in the food industry. In particular, on the market, there are a number of products, for example various flavours of instant sauces and gravies, which are mixtures of ingredients dried using traditional methods.

Such products have certain advantages. Normally, they are mixtures of flakes or powders of various types of vegetables, tomatoes, mushrooms, cheeses etc. obtained using traditional drying techniques and, therefore, very coriaceous and poorly soluble in water. This means there is a need to cook such products for relatively long amounts of time before being able to consume them (six to ten minutes). Furthermore, in order to be able to obtain homogeneous and creamy mixtures, after cooking, the known products contain binding additives such as for example flour and starch, or synthetic emulsifiers such as for example polyglycerin behenate. Despite the presence of emulsifiers, during cooking, the known products give rise to the formation of clumps, preventing the homogeneous mixing and uniform cooking of the product.

Another disadvantage relates to the aesthetic appearance of known dried products, which are normally characterised by pale and bland colours. Furthermore, the consistency of the solid mixture is not homogeneous since powdered ingredients tend to adhere to the inner surfaces of the packaging due to electrostatic phenomena. This is rather unappealing for the consumer, thus known instant sauces are normally packaged in non-transparent packs.

Also, in the known instant sauces, a further disadvantage relates to the presence of other chemical additives, such as for example: preservatives, powdered animal or vegetable fats, flavour enhancers, for example sodium glutamate, and sugars such as dextrose and sucrose. The added sugars in particular make such products unsuitable for diabetics.

SUMMARY OF THE INVENTION

The problem at the heart of the present invention is that of providing instant sauces for food use, and a process for the preparation thereof, which allows overcoming the above mentioned drawbacks of the known art.

Said problem is resolved by instant sauces and a method for the preparation thereof as defined in the enclosed claims.

DETAILD DESCRIPTION OF THE INVENTION

In a first aspect, the present invention relates to an instant sauce for food use comprising 1 to 20% by weight, preferably 3 to 15% by weight of a basic mixture, 8 to 60% by weight, preferably 12 to 55% by weight of a potato product and 20 to 91%, preferably 30 to 83% of a mixture of high granulometry ingredients.

The basic mixture, in turn, comprises a mixture of at least one oily antioxidant compound and salt, particularly 1 to 15% by weight, preferably 2 to 7% by weight of at least one oily antioxidant compound and 99 to 85% by weight, preferably 93 to 98% by weight of salt. The salt may be fine, or higher granulometry, optionally iodated salt, may be used.

Advantageously, the oily antioxidants (or antioxidants dissolved in oil) used are selected from: Both natural and synthetic ascorbyl palmitate, tocopherol (vitamin E), gallates, particularly propyl gallate, octyl gallate and dodecyl gallate, tert-butylhydroquinone (TBHQ), butyl hydroxyanisole (BHA), butyl hydroxytoluol (BHT), soy bean lecithin, rosemary extract containing tocopherols, the product known as "Grindox" containing ascorbyl palpitate, natural tocopherols and alpha-tocopherol, or mixtures of two or more of said oily antioxidants.

The basic mixture also preferably consists of powdered ingredients, present in the form of fine, light powders. In said basic mixture, said powdered ingredients are included in quantities of between 25% and 85%, preferably between 35 and 75%, while the mixture of at least one oily antioxidant compound and salt is present in quantities of between 15 and 75% by weight of the basic mixture, preferably between 25 and 65% by weight.

The powdered substances are preferably dried or lyophilised substances and play the role of flavourings, so as to give the sauce its particular distinctive character.

The powdered substances making up the basic mixture are preferably dried or lyophilised substances and are selected from: cheeses, vegetables, mushrooms, mixtures of flavourings and maltodextrin-supported freeze-dried saffron, or a mixture containing flavourings and spray-dried oregano to give the so-called "pizza preparation".

The cheeses are selected from pecorino or parmesan, dried using the spray-drying or freeze-drying technique. The vegetables are preferably selected from: Dried, pulverised spinach, while the mushrooms are preferably porcini mushrooms, dried by means of the spray-drying technique.

The instant sauce also includes flavourings in quantities ranging between 0.2 and 10% by weight, preferably between 0.5 and 8% by weight. Advantageously, such flavourings are used in powdered form.

The potato product is preferably made up of potato flakes.

The potato flakes are preferably dried flakes, in particular, obtained from potato puree, dried using the drum-drying technique on a rotating drum.

The term "mixture of high granulometry ingredients" is used to mean a mixture of ingredients in the form of flakes, chips, granules, pieces or coarse or medium spice powders.

The substances in the form of flakes, chips and granules or pieces are selected from, for example, tomato chips, cheddar cheese chips, spinach flakes, olive chips, mushroom chips, omelette cubes, dehydrated or freeze dried basil leaves, freeze dried ricotta granules, garlic granules, dehydrated oregano leaves, dried granulated basil extract, dehydrated parsley leaves, dried caper granules, dried mixed vegetable granules, dried red pepper chips, crushed chilli peppers and mixtures thereof.

The tomato chips are obtained from tomato sauce, dried using the spray-drying technique and transformed into chips by means of a roller. In particular, said chips are randomly shaped and produced by breaking up a sheet made by compressing it in the roller between two cylinders.

The cheddar chips are elongated friable chips of lyophilised white cheddar cheese.

The spinach flakes are obtained from spinach puree dried on a rotating drum, or from freeze dried or hot air dried spinach leaves.

The olive chips are obtained from dried black olives, while the mushroom chips are obtained from dried porcini mushrooms.

The omelette cubes are obtained from freeze-dried pre-cooked omelettes.

Advantageously, the flakes, chips and granules are sized between 0.1-1 cm in diameter or 0.2-2 cm in length.

The coarse or medium sized spice powders are selected from: sun dried or hot air dried pepper, chilli, turmeric, nutmeg, paprika, flavouring mixtures such as mixtures of celery, onion and carrot granules to give the so-called "sautéed mixture".

The instant sauce is a mixture which is perfectly soluble in water, in which the fibrous, more solid and consistent components are carefully measured so as not to alter the overall solubility of the mixture. The sauce of the invention does not require cooking and is instantly prepared, in less than a minute, following the addition of water. Adding water transforms the solid mixture into soft cream with no solid, difficult to chew, residue.

Depending on the ingredients mixed, selected from those described above, sauces of various flavours are obtained which can be used in a number of ways, not just as instant sauces or pasta or rice, but also as toppings for toast, or as an accompaniment for meat dishes.

Examples of instant sauces according to the invention include: Genoese pesto, four cheese sauce, spinach sauce, bruschetta topping, porcini mushroom sauce, tomato and mozzarella salad sauce, pizza sauce, risotto sauce, spicy "devil" sauce, tapenade sauce and carbonara sauce.

In a second aspect, the present invention relates to a process for the preparation of the instant sauce of the invention.

The preparation process comprises the following steps:
a) mixing the salt with one or more oily antioxidants;
b) adding one or more of the powdered ingredients;
c) adding the flaked, chipped or granular substances.

In step a) the salt, preferably fine, but can even be higher granulometry salt, for example iodated salt, is put inside a device fitted with an Archimedean screw; then one or more of the oily antioxidant substances are added, preferably by making it flow longitudinally along the screw. The components are then mixed until the salt has assumed a uniform colour (5-15 minutes). Besides mixing the products, the screw imparts friction and aids absorption of the oil into the salt granules. This way, a "greasy" mixture is made which is capable of binding and trapping the powdered flavouring substances, added in step b), avoiding any electrostatic phenomena and dispersion of the powders in the final sauce packaging.

Then the powdered substances are added into the Archimedean screw mixer and are mixed for 5-15 minutes (step b)). Together with the powdered substances, powdered flavourings may optionally be added.

This way a powdery "pre-mix" is obtained consisting of between 3 to 15% by weight of the final product, while the part made up from the flaked, chipped or granular substances (including the potato flakes) represents between 85 to 97% by weight of the finished product.

After having prepared the "pre-mix" in the Archimedean screw mixer, it is then transferred to another mixer, preferably V shaped or "trouser" mixer; alternatively, a "Y" shaped or rotating drum or a rotating dual cone mixer may be used. Then the flaked, chipped and granular substances are included (step c)), preferably adding the potato flakes first (step c1)) and, later, the remaining flaked, chipped and granular substances (step c2)).

Thanks to their porosity and high starch content, the potato flakes absorb the residual oily portion of the "pre-mix" along with any powdered flavourings etc.

After adding the potato flakes, there is a brief mixing stage for 15-40 seconds, preferably for approx. 30 seconds. Then the flaked, chipped and granular substances are included, along with the granular flavourings and the mixture mixed once more for 2-10 minutes, preferably approx. 3 minutes.

The later mixing step (step c2)) is the most critical stage of the preparation process due to the fragility and friability of the chipped and flaked substances, in particular: the tomato chips which are very fragile and likely to break during mixing, and the olive and mushroom chips, which are sensitive to crushing.

This stage has thus been optimised in terms of mixing time, granulometry or flake, chip or granule size, quantity of components to be mixed, and selection of the "type" of flaked, chipped or granular substance to be used.

In particular, analysis of the mixtures obtained following mixing, performed by means of sieving with various sized meshes, has lead to establishing the ideal quantities and mixing times for each type of mixture.

The granulometry or dimensions of the flaked, chipped and granular substances is itself very important for obtaining an instant sauce according to the invention. In particular, it is preferable to use substances with granulometries or dimensions of between 0.1-1 cm in diameter or 0.2-2 cm long.

In relation to the "type" of substance to be used, a greater amount of flaked, chipped or granular substances or those obtained using drum-drying or spray-drying techniques with subsequent compaction have been chosen, with respect to traditionally dried substances. This is an important difference with respect to the known substances, which for the most part contain a large amount of traditionally dried substances which therefore are more coriaceous and less soluble in water.

Furthermore, among the powdered substances used in step a) it is preferable to use a greater quantity of freeze-dried or spray-dried substances, with respect to traditionally dried substances.

This way, instant sauces are obtained which, following the addition of water and without any cooking, are transformed into a dense creamy solution which perfectly reproduces the natural consistency of fresh sauce, without the use of any emulsifiers or flour. Indeed, the known products have a creamy consistency thanks to the addition of emulsifiers or flour necessary to combine the dried substances together, otherwise they would remain separated from one another. Consequently, such known products require cooking, for periods of time generally comprised of between six and seven minutes, and sometimes lead to the formation of lumps.

On the contrary, a creamy and dense consistency is obtained in the present instant sauce thanks to the special preparation process and without the addition of any further additives. This represents a great advantage with respect to the known products.

Despite the more than satisfactory microbiological and physico-chemical stability of the sauce of the invention, in order to increase the shelf-life, it is possible to add to the mixture 0.1 to 2% by weight of tribasic calcium phosphate, calcium or magnesium stearate, low water content potato starch, microcrystalline cellulose and/or potassium ferricyanide (the latter with a maximum concentration of 0.2%).

Such additives are capable of increasing the flowing properties of the mixture, this slowing any potential agglomeration of the mixture, due to the slow but perceptible absorption of water by the powders and chips, which are highly hygroscopic, a phenomenon which reduces the product shelf-life.

To increase the shelf-life of the sauces of the invention, besides using the above described additives, or as an alternative to them, special packaging has been developed.

In a third aspect, the present invention relates to packaging containing the instant sauce of the invention.

As opposed to the known instant products, which are solid non-homogeneous mixtures where the powdered ingredients adhere to the packaging walls due to electrostatic attractive phenomena, thanks to the innovative production process, such phenomena do not occur with the sauce of the invention.

Thus, while the known products must be packaged in non-transparent packets, due to their rather unappealing appearance, the sauces of the invention may be packaged in transparent trays, for example made from PET or PETG materials. Indeed, they have an attractive appearance for the end consumer, also highlighted by their vivacious and natural colour, obtained by using spices such as turmeric and paprika. Thus the colour of the sauces of the invention is natural and not obtained by means of artificial colourants, like the majority of products on the market.

Alternatively, in order to package greater quantities of product, transparent mesh packets with transparent windows, or aluminium packets or three-ply packets, for example Pet+Alu+Pe, guaranteeing greater protection against light, heat and humidity, may be used.

In order to prolong the shelf-life beyond two years, the sauce of the invention may be packaged in the aforementioned transparent trays, with optional UV ray absorbent additives contained in the polymer matrix of the tray or fitted with special lids containing oxygen and humidity absorbing substances. For example, such substances are included in the lid and, particularly, inside a permeable cardboard cylinder embedded in the same.

Alternatively, such substances are packaged in special porous bags which are inserted under the lid of the tray.

The oxygen or humidity trapping substances are advantageously mixtures of unsaturated organic compounds and inorganic compounds such as silica gel, graphite, $Ca(OH)_2$, fine iron powder coated with salt and natural zeolites impregnated with a NaCl solution.

Alternatively, packaging under an inert atmosphere, obtained by using both gaseous nitrogen and small amounts of liquid nitrogen, may be used.

Examples of Instant Sauces

Genoese Pesto

| Powdered pre-mix | |
|---|---|
| Fine salt with oily antioxidant (basic mixture) | 5.00% |
| Powdered pecorino preparation (spray-dried pecorino) | 6.00% |
| Flavourings | 2.50% |
| Total | 13.5% |

To the powdered premix (obtained in step b) of the above-described process) are added potato flakes and then the other chipped, flaked and granular ingredients, in the percentages reported below.

| Potato flakes | 46.00% |
|---|---|
| Freeze-dried Cheddar or Edam chips | 20.00% |
| Freeze-dried basil | 10.00% |
| Dry, granular basil extract | 7.00% |
| Garlic granules | 3.50% |
| Total | 86.5% |

4 Cheese Sauce

A powder premix is prepared composed of a mixture of an oily antioxidant and salt (3-5%), flavourings and pecorino preparation (spray-dried pecorino) or spray-dried parmesan (mixture of step b). Said mixture corresponds to 13.1-15.0% of the finished product.

To this mixture is added the potato flakes (48-52%) and then the other chipped, flaked and granular ingredients to give a total quantity equal to 85-86.9%. Such flaked, chipped and granular components include: 4 seasons crushed pepper, granulated gorgonzola cheese (freeze-dried), freeze-dried Cheddar or Edam chips.

Spinach Sauce

A powder premix is prepared composed of a mixture of an oily antioxidant and salt (3-5%), flavourings, pecorino preparation (spray-dried pecorino) or spray-dried parmesan and powdered spinach (mixture of step b). Said mixture corresponds to 13-15% of the finished product.

To this mixture is added the potato flakes (28-30%) and then the other chipped, flaked and granular ingredients to give a total quantity equal to 85-87%. Such flaked, chipped and granular components include: dehydrated spinach leaves, dehydrated basil leaves, freeze-dried Cheddar chips, ricotta granules (freeze-dried), garlic granules, ground nutmeg, natural dried extracts and ground black pepper.

Bruschetta Sauce

A powder premix is prepared composed of a mixture of an oily antioxidant and salt (3-4%) and flavourings (mixture of step b)). Said mixture corresponds to 5.0-6.0% of the finished product.

To this mixture is added the potato flakes (12.50-14.50%) and then the other chipped, flaked and granular ingredients to give a total quantity equal to 94.00-95.00%. Such flaked, chipped and granular components include: tomato chips, oregano leaves, garlic granules, ground sweet paprika, dried basil granules.

Porcini Mushroom Sauce

A powder premix is prepared composed of a mixture of an oily antioxidant and salt (3-5%), mushroom powder and flavourings (mixture of step b)). Said mixture corresponds to 14.00-15.00% of the finished product.

To this mixture is added the potato flakes (48.00-50.00%) and then the other chipped, flaked and granular ingredients to give a total quantity equal to 85.00-86.00%. Such flaked, chipped and granular components include: parsley leaves, dried porcini mushroom chips, ground black pepper, garlic granules.

Mozzarella Salad Sauce

A powder premix is prepared composed of a mixture of an oily antioxidant and salt (1-2%), natural dried extracts and flavourings (mixture of step b)). Said mixture corresponds to 3-5% of the finished product.

To this mixture is added the potato flakes (28-29%) and then the other chipped, flaked and granular ingredients to give a total quantity equal to 95-97%. Such flaked, chipped and granular components include: tomato chips, dried basil extract granules, garlic granules, ricotta granules (freeze-dried), parsley leaves, ground black pepper.

Pizza Sauce

A powder premix is prepared composed of a mixture of an oily antioxidant and salt (4.00-6.00%), natural dried extracts, pizza flavourings and preparation (flavourings, oregano) (mixture of step b)). Said mixture corresponds to 11.50-13.50% of the finished product.

To this mixture is added the potato flakes (24.50-25.50%) and then the other chipped, flaked and granular ingredients to give a total quantity equal to 86.50-88.50%. Such flaked, chipped and granular components include: oregano leaves, tomato chips, garlic granules, dried caper granules, sautée mix (celery, carrot and onion granules) and ground black pepper.

Risotto Preparation

A powder premix is prepared composed of a mixture of an oily antioxidant and salt (2.00-4.00%), freeze dried saffron on maltodextrin and flavourings (mixture of step b)). Said mixture corresponds to 5.00-7.00% of the finished product.

To this mixture is added the potato flakes (42.00-44.00%) and then the other chipped, flaked and granular ingredients to give a total quantity equal to 93.00-95.00%. Such flaked, chipped and granular components include: sautée mix (celery, carrot and onion granules), dried natural extracts, turmeric powder, finely chopped dried vegetable granules, freeze-dried Cheddar or Edam chips, dried parsley leaves.

Spicy "Devil" Sauce

For the spicy devil sauce, the oily antioxidant and salt mix (4.00-6.00%) (step a) is prepared, and then all the other ingredients added simultaneously. The ingredients used are the following: potato flakes (18.00-22.00%), garlic granules, tomato chips, crushed chilli peppers, red bell pepper, paprika powder, dried parsley leaves, sautée mix (celery, carrot and onion granules) and natural dried extracts.

Tapenade Sauce

A powder premix is prepared composed of a mixture of an oily antioxidant and salt (5.00-6.00%) and flavourings (mixture of step b)). Said mixture corresponds to 6.00-7.00% of the finished product.

To this mixture is added the potato flakes (34.00-36.00%) and then the other chipped, flaked and granular ingredients to give a total quantity equal to 93.00-94.00%. Such flaked, chipped and granular components include: dried black olives, tomato chips, dried caper granules, dried parsley leaves, crushed chilli peppers.

Carbonara Sauce

A powder premix is prepared composed of a mixture of an oily antioxidant and salt (2.00-4.00%), pecorino preparation (spray-dried precorino), flavourings and sautée mix (celery, carrot and onion granules) (mixture of step b). Said mixture corresponds to 13.00-15.00% of the finished product.

To this mixture is added the potato flakes (50.00-52.00%) and then the other chipped, flaked and granular ingredients to give a total quantity equal to 85.00-87.00%. Such flaked, chipped and granular components include: freeze-dried omelette cubes, freeze-dried Cheddar or Edam chips, parsley leaves, ground turmeric, ground black pepper.

ADVANTAGES

This invention relates to novel method for preparing instant pasta sauces based on typical traditional Italian recipes. The combination of tomato and other vegetables such as bell peppers, spinach, porcini mushrooms, olives, potatoes, cheese granules and not, carefully flavoured with various spices such as pepper, chilli pepper, parsley, basil, saffron and such like, in the best Italian tradition to give an excellently made product with natural and attractive flavour and appearance.

The particular combination of carefully selected powdered, flaked, chipped and granular food ingredients, gives the product excellent solubility, mixability and creaminess.

The sauces of the invention constitute a perfectly water soluble mixture where the fibrous, solid and consistent component has been carefully measured so as not to alter the overall solubility of the mixture.

Furthermore, said sauces do not require cooking and are ready in less than a minute, or in less time than any other product on the market. They are naturally soft and creamy, and do not have any difficult to chew solid residues.

The careful selection of ingredients to be used in the instant sauces of the invention eliminate the need for adding emulsifiers or flour in order to acquire a creamy consistency, as opposed to the other products on the market.

Indeed, the other products already on the market contain flour or starch, required for combining the dried ingredients together which would otherwise remain uncombined; as a consequence, such products require cooking for a length of time of around six to seven minutes, and thus lead to the formation of lumps.

Another advantage of the sauces of the invention is the good appearance obtained using the innovative preparation process of the invention. Indeed, a less than perfect mixing sequence would cause the powdery flavourings and foodstuffs to adhere to the inner surfaces on the container due to electrostatic attraction phenomenon. This would result in deterioration of the homogeneity of the mixture and the "mask effect" of the powdered foodstuffs on the packaging.

In reality, this occurs with the other products on the market, normally packaged in aluminium packs, where the powders adhere to the inner surfaces.

The result obtained by applying the process of the invention is a homogeneous, aromatic product with excellent appearance.

The particular mixing technique of the process of the invention then has a further and important advantage from the technological viewpoint: The mixture of chips and powders is coated with a very thin greasy film, which also acts as a natural lubricant. A role is also played by the heterogeneity of the shapes, thus the sauces of the invention have optimal flowing properties and do not require anti-caking additives in order to prevent packing.

The good appearance of the product of the invention is also due to the particular selection of the ingredients, which is a multicoloured mixture of different shapes and colours, unique of its kind. Thus the instant sauces differ from those on the market, normally with a uniform appearance, with pale insipid colours, and thus less attractive to the consumer's eye. Again for this reason, the majority of instant sauces are packaged in non-transparent packs.

The sauce ingredient colours have been chosen carefully in order to give the product a vivacious and natural appearance. This is obtained without the addition of any artificial colourants. The tomato granules and potato flakes, in which the yellow colour is brought out by the presence of turmeric added during processing, are an obvious example.

Thanks to the fact that the product has a pleasing appearance, it is possible to package it in transparent trays or packs, or a plastic bag with a transparent window. Another important advantage with respect to the known sauces.

Another advantage is the long shelf-life of the product, which is two years or more. Said preservability, obtained without the use of any chemical additives, is due exclusively to the dried form of the product, and the presence of salt and oily antioxidants, which continues to last after the pack has been opened.

Furthermore, the sauce of the invention does not contain sodium glutamate or other flavour enhancers which are present, on the other hand, in the other analogous products on the market.

Furthermore, the product is entirely natural, and ingredients such as powdered plant or animal fats have not been added; this helps to preserve the food by improving storage, in that it makes it less susceptible to chemical breakdown. Oil or butter, in whatever amount, is added at the time of reconstitution of the sauce, according to the consumers taste. The product of the invention is also healthier than products requiring cooking, in that the lipid component does not undergo degeneration caused by heating. Furthermore, there are no added sugars, such as dextrose or sucrose. This makes the product ideal for consumption by diabetics.

Finally, the sauces of the invention are very versatile since they can be used not only as pasta sauces, but also as bases or dressing meats and cheeses, and for preparing soups, canapés and other dishes.

What we claim is:

1. An instant sauce consisting essentially of 1% to 20% by weight of a basic mixture, 8% to 60% by weight of potato products and 20% to 91% by weight of a mixture of high granulometry ingredients, wherein the high granulometry ingredients are in a form selected from the group consisting of flakes, chips, granules, pieces, coarse spice powders and medium spice powders, wherein said basic mixture consists of a mixture of powdered ingredients present in a quantity between 25% and 85% by weight of said basic mixture, and at least one pre-mixed oily antioxidant and salt mixture present in a quantity between 15% and 75% by weight of said basic mixture, and wherein the oily antioxidant is present in a quantity between 1% to 15% by weight of the oily antioxidant and salt mixture and wherein the salt is present in a quantity between 85% to 99% by weight of the oily antioxidant and salt mixture, wherein said instant sauce does not contain emulsifiers and it is instantly prepared into a dense creamy solution in less than one minute following the addition of water.

2. The sauce according to claim 1 wherein said basic mixture comprises between 3% and 15% by weight, said potato products comprise between 12% and 55% by weight, and said mixture of high granulometry ingredients comprise between 30% and 83% by weight.

3. The sauce according to claim 1 wherein said basic mixture-comprises 2% to 7% by weight of said at least one oily antioxidant and 93% to 98% by weight of said salt.

4. The sauce according to claim 3 wherein said at least one oily antioxidant is selected from the group consisting of natural ascorbyl palmitate, synthetic ascorbyl palmitate, tocopherol (vitamin E), gallate, tert-butylhydroquinone (TBHQ), butyl hydroxyanisole (BRA), butyl hydroxytoluol (BHT), soy bean lecithin, rosemary extract containing tocopherols, Grindox™ containing ascorbyl palpitate, natural tocopherol and alpha-tocopherol, and mixtures of two or more of said oily antioxidants.

5. The sauce according to claims 3 wherein said potato products are flakes obtained from mashed potato, dried using a drum-drying technique on a rotating drum.

6. The sauce according to claim 1 wherein said powdered ingredients are dried or freeze-dried, and are selected from the group consisting of cheeses, vegetables, mushrooms, maltodextrin supported freeze dried saffron, and a pizza mix comprising flavorings and spray dried oregano.

7. The sauce according to claim 6 wherein said cheeses are selected from spray dried or freeze dried pecorino or parmesan; said vegetables are dried pulverized spinach; and said mushrooms are spray dried porcini mushrooms.

8. The sauce according to claim 1 wherein said spices are selected from the group consisting of sun-dried pepper, hot air dried pepper, chili pepper, turmeric and nutmeg.

9. The sauce according to claim 8, further comprising a flavoring mixture of celery, carrot and onion granules.

10. The sauce according to claim 1 wherein said high granulometry ingredients are selected from the group consisting of tomato chips, Cheddar cheese chips, spinach flakes, olive chips, mushroom chips, omelette cubes, dehydrated basil leaves, freeze-dried ricotta granules, garlic granules, dehydrated oregano leaves, dried basil extract granules, dehydrated parsley leaves, dried caper granules, dried mixed vegetable granules, dehydrated red bell pepper chips, crushed chili peppers and mixtures thereof.

11. The sauce according to claim 10 wherein said tomato chips are obtained from spray dried tomato sauce transformed into chips using a roller; said Cheddar chips are long friable chips of freeze dried white Cheddar; said spinach flakes are obtained from the group consisting of spinach puree dried on a rotating drum, freeze dried spinach leaves and hot air dried spinach leaves; said olive chips are obtained from dried black olives; said mushroom chips are obtained from dried porcini mushrooms; and said omelette cubes are obtained from pre-cooked, freeze dried omelette.

12. The sauce according to claim 1 wherein said high granulometry ingredients are selected from the group consisting of sizes between 0.1-1.0 cm in diameter and 0.2-2.0 cm in length.

13. The sauce according to claim 1 further comprising flavorings in a quantity ranging from 0.2 to 10% by weight.

14. The sauce according to claim 13 wherein said flavorings are in powder form.

15. The sauce according to claim 1 further comprising from 0.1 to 2% by weight of additives selected from the group consisting of tribasic calcium phosphate, calcium stearate, potato starch, microcrystalline cellulose, and potassium ferricyanide at a maximum quantity of 0.2%.

16. A partially or completely transparent pack characterized in that the pack contains the sauce according to claim 1.

17. The partially or completely transparent pack according to claim 16, wherein the pack is a plastic bag with a transparent window.

18. The partially or completely transparent pack according to claim 16, wherein the pack is a transparent tray with a lid.

19. The partially or completely transparent pack according to claim 18 wherein oxygen absorbing or water absorbing substances are included inside the lid.

20. The partially or completely transparent pack according to claim 19 wherein said oxygen absorbing or water absorbing substances are inserted inside the lid.

21. The partially or completely transparent pack according to claim 19 wherein said oxygen absorbing or water absorbing substances are packed in porous bags inserted under the lid.

22. The partially or completely transparent pack according to claim 19 wherein said oxygen absorbing or water absorbing substances are mixtures of unsaturated organic compounds and inorganic compounds.

23. The partially or completely transparent pack according to claim 22 wherein said inorganic compounds are selected from the group consisting of silica gel, graphite, $Ca(OH)_2$, fine iron powder coated with salt, and natural zeolites impregnated with a NaCl solution.

24. The partially or completely transparent pack according to claim 16 wherein the sauce is packaged under an inert nitrogen atmosphere.

25. A process for the preparation of the sauce according to claim 1 comprising the steps of:
  a) mixing the salt with one or more oily antioxidants;
  b) adding one or more of the powdered ingredients; and
  c) adding the flaked, chipped or granular substances.

26. The process according to claim 25 wherein, in step a), said salt is transferred into an Archimedean screw apparatus into which is added one or more of said oily antioxidant substances.

27. The process according to claim 25 wherein said salt and said one or more oily substances are mixed for 5-15 minutes to create a greasy mixture.

28. The process according to claim 25 wherein, following the addition of the powdered substances in step b), there is a second mixing step of 5-15 minutes.

29. The process according to claim 25 wherein in step b) a powdered flavoring is added.

30. The process according to claim 25 wherein the mixture obtained in step b) is included in a finished product in a quantity ranging from 3% to 15% by weight of the finished product, and the flaked, chipped or granular substances and the potato flakes are included in the finished product in a quantity ranging from 85% to 97% by weight of finished product.

31. The process according to claim 25 wherein the mixture of step b) is transferred into a second mixer.

32. The process according to claim 25, further comprising within step c) the step of:

c1) adding potato flakes alone-and mixing for 15-40 seconds.

33. The process according to claim 25, further comprising within step c) the step of:

c2) adding the remaining flaked, chipped and granular substances into the mixer and mixing for 2-10 minutes.

34. The sauce according to claim 1 wherein said powdered ingredients are included in a quantity between 35% and 75%.

35. The sauce according to claim 1 wherein the mixture of at least one oily antioxidant compound and salt is present in a quantity between 25% and 65% by weight of the basic mixture.

36. The sauce according to claim 13, wherein the flavorings are in a quantity ranging from 0.5% to 8% by weight.

37. The sauce according to claim 4, wherein the galate is selected from the group consisting of propyl gallate, octyl gallate and dodecyl gallate.

* * * * *